Feb. 21, 1939.  H. STEINER  2,147,935
OUTPUT CONTROL OF FLOATING PISTON ENGINE GAS PLANTS
Filed April 15, 1935  6 Sheets-Sheet 1
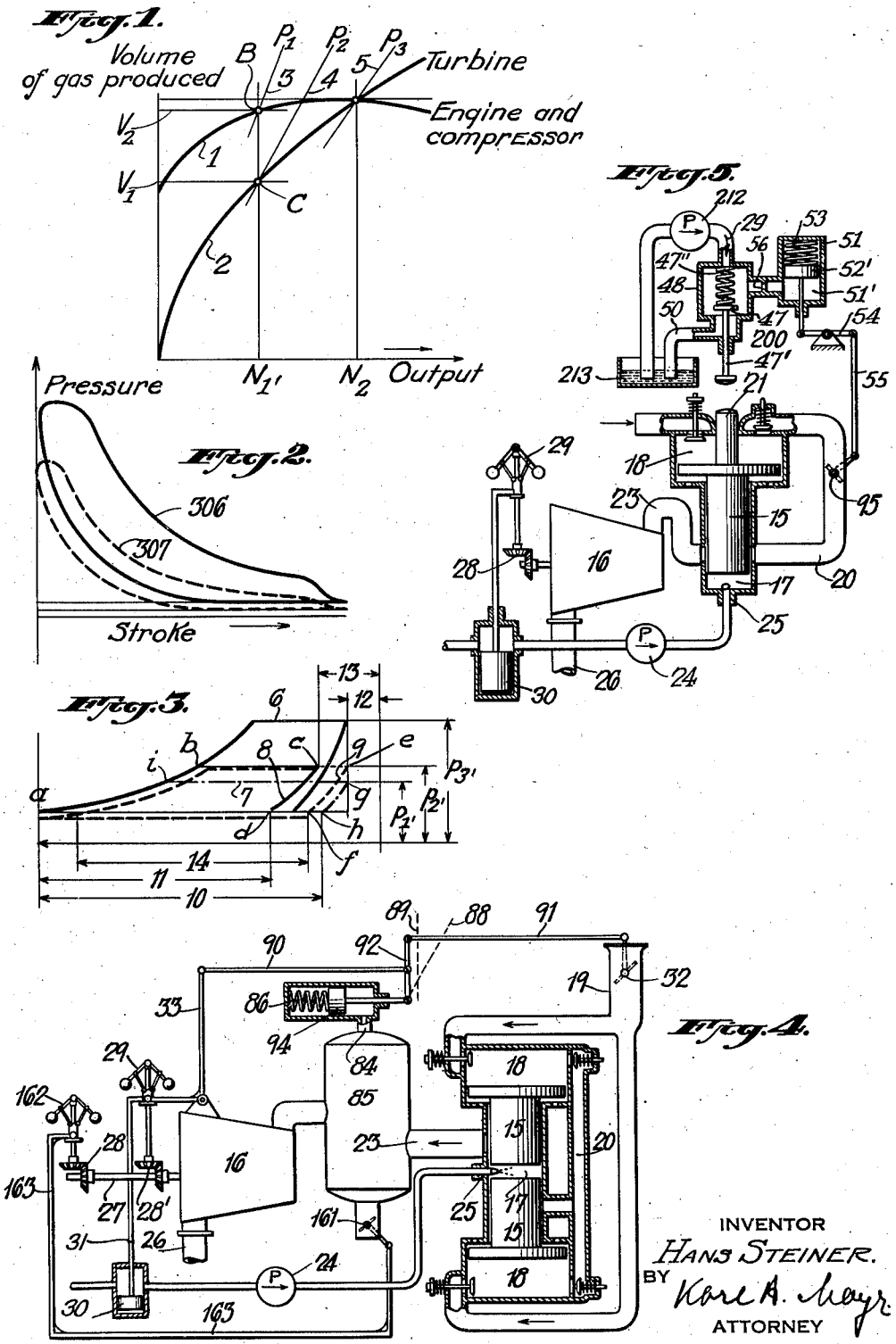

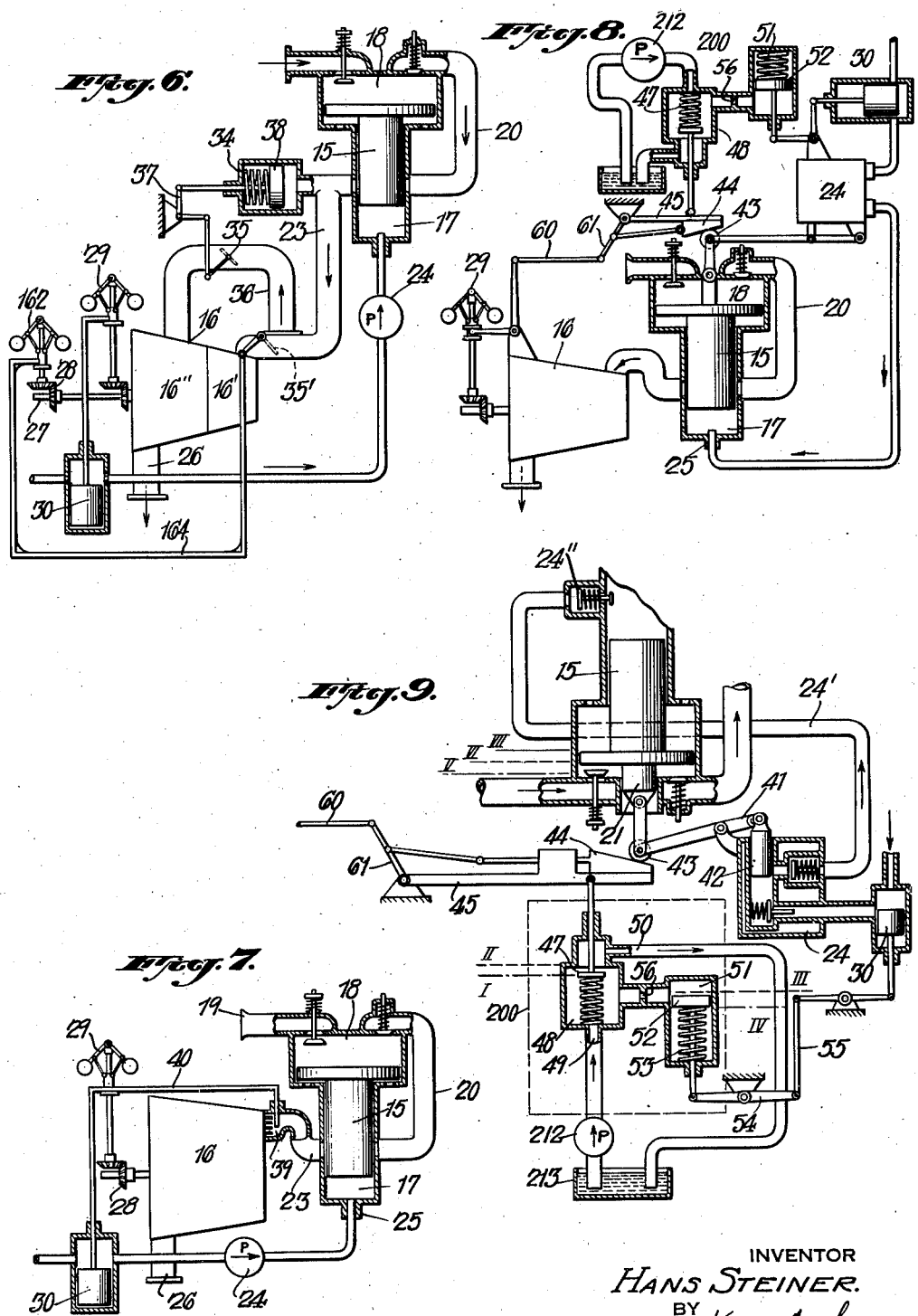

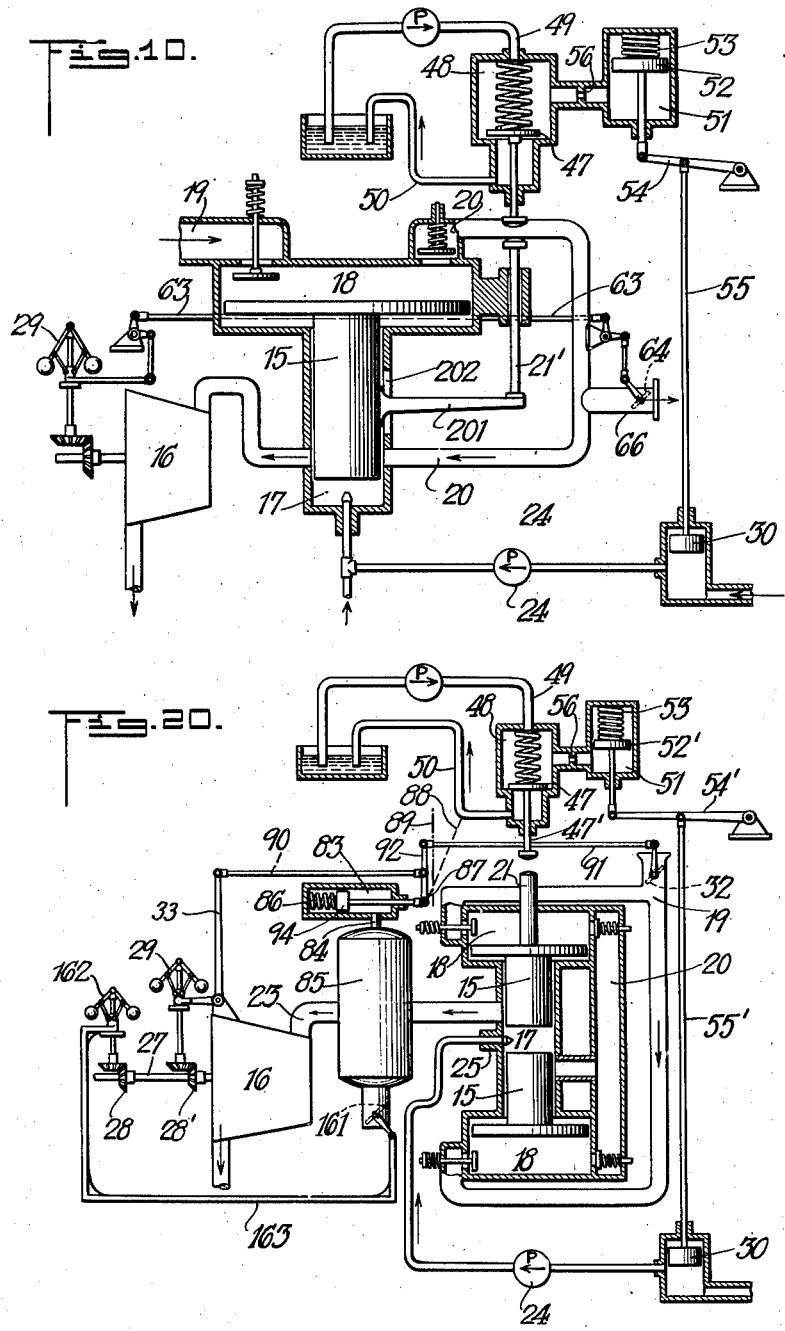

Feb. 21, 1939.　　　　H. STEINER　　　　2,147,935
OUTPUT CONTROL OF FLOATING PISTON ENGINE GAS PLANTS
Filed April 15, 1935　　　6 Sheets-Sheet 4

INVENTOR
HANS STEINER.
BY Karl A. Mayr
ATTORNEY

Feb. 21, 1939.  H. STEINER  2,147,935
OUTPUT CONTROL OF FLOATING PISTON ENGINE GAS PLANTS
Filed April 15, 1935  6 Sheets-Sheet 5
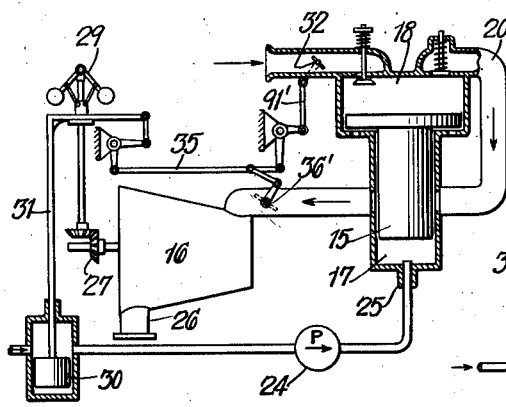
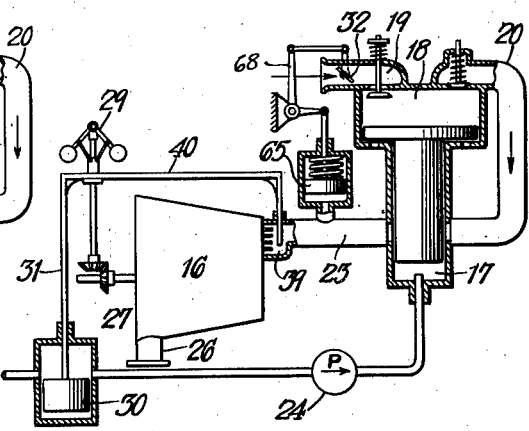
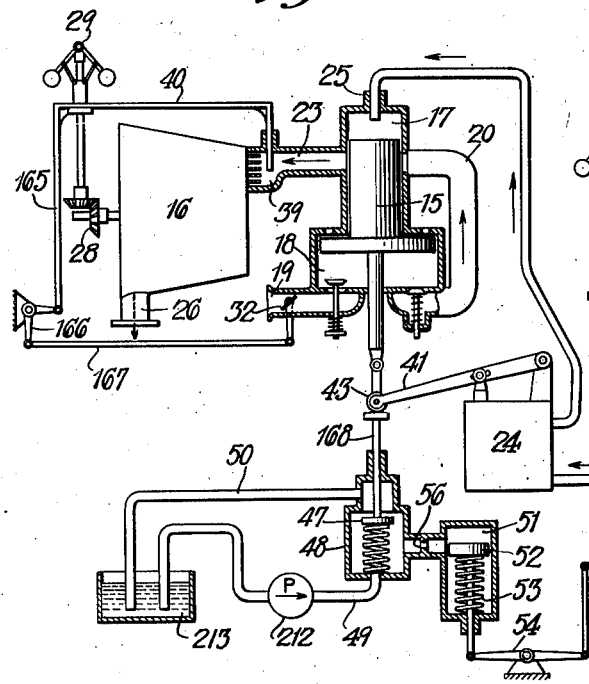
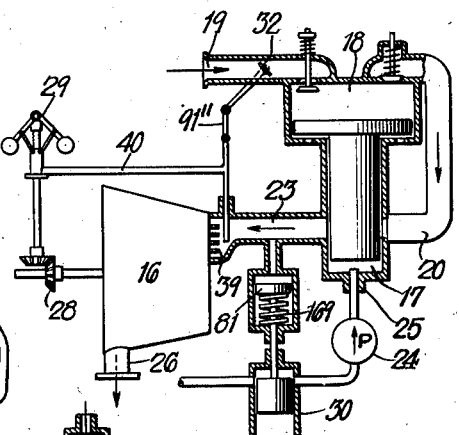
INVENTOR
*Hans Steiner.*
BY
ATTORNEY

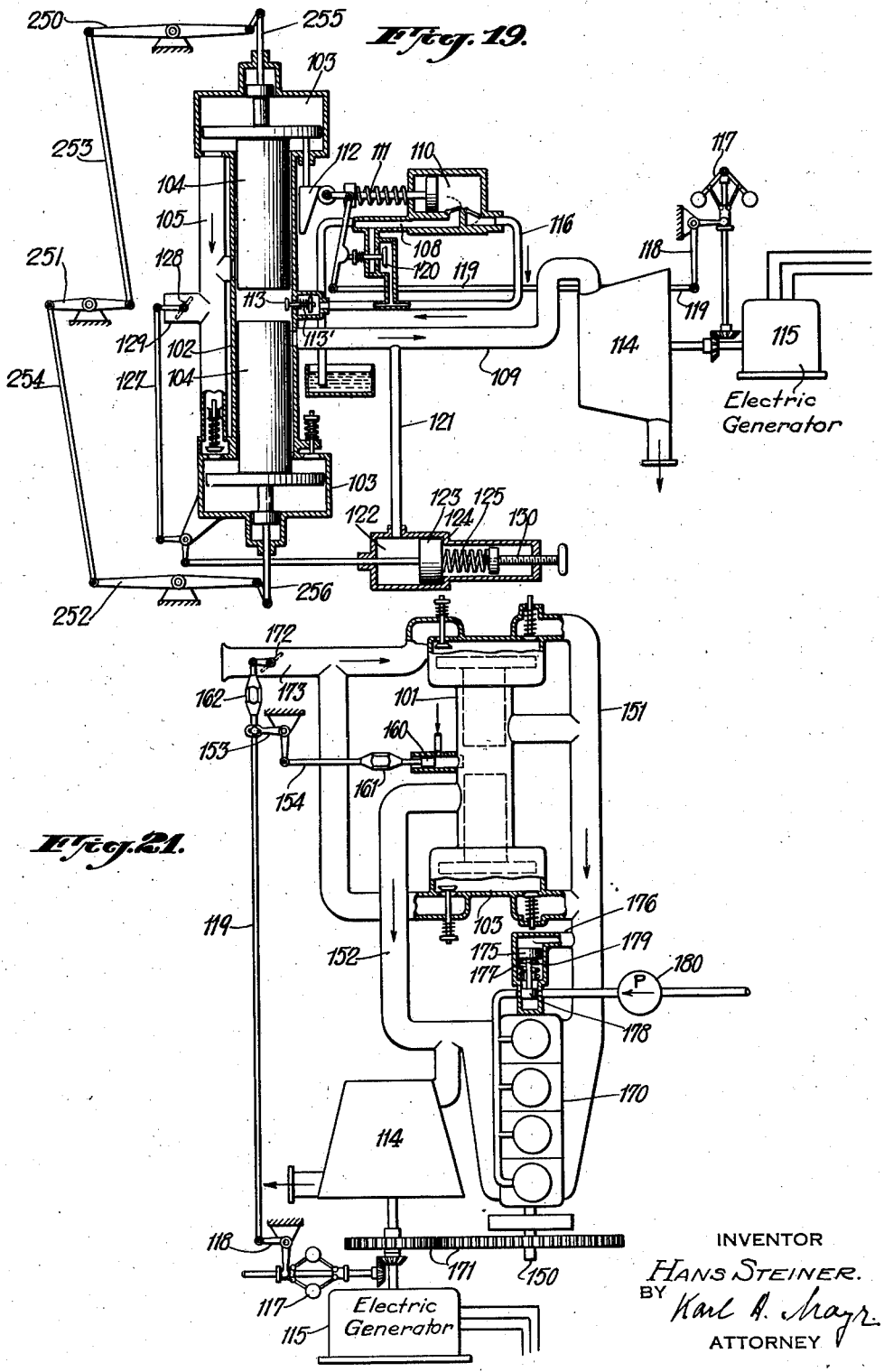

Patented Feb. 21, 1939

2,147,935

UNITED STATES PATENT OFFICE 2,147,935

OUTPUT CONTROL OF FLOATING PISTON ENGINE GAS PLANTS

Hans Steiner, Winterthur, Switzerland, assignor to Sulzer Frères, Societe Anonyme, Winterthur, Switzerland Application April 15, 1935, Serial No. 16,434
In Switzerland April 17, 1934

18 Claims. (Cl. 60—13)

The present invention relates to control methods and apparatus for plants in which the exhaust gases of internal combustion floating or free stroke piston compressor motors are used for operating a power engine from which external power may be taken or other consumer, more particularly for coordinating amount and conditions of the gas produced in floating or free stroke piston compressor motors with the amount and conditions required by a consumer of said gases.

In internal combustion floating piston compressor motors, the number of strokes per time unit of the floating pistons depends on the work per stroke, i. e., the work produced at one to-and-fro motion of the power part of the floating piston. In contradistinction to the speed control of rotary compressors or reciprocating compressors having crank shafts, a change in the number of strokes per time unit of floating pistons is not possible without also changing the work done per stroke.

The initial velocity of the floating piston depends on the energy developed at the ignition of the operating medium in the same manner as is the case when firing a gun. The mean velocity and the time required for one stroke of the floating piston directly depend on its initial velocity; the greater the energy developed at ignition, the shorter is the time it takes to complete one stroke and the greater is the number of strokes per minute. The greater the energy developed at ignition, the greater is the work done per stroke, and—as has been pointed out before—the greater is the number of strokes per time unit. Of course, the length of the stroke is increased when more energy is developed at ignition; this change of the length of the stroke, however, amounts to a few per cent only and this change has, therefore, practically no influence on the dependence of the number of piston strokes on the load.

An object of the present invention resides in the provision of methods and means for controlling floating piston motor-compressor plants producing gas for a gas consumer in such manner that the gas produced is adjusted according to the requirements of the gas consumer exactly and without time lag. The method and means according to the present invention are of such nature that the amount and pressure of the gas are at once adjusted when the gas consumption changes and that this adjustment effectively takes place during the control action of the control means which are responsive to the load condition of the gas consumer, in contradistinction to known control methods, whereby various control steps come into action consecutively, whereby one action depends on and must wait for a previously effected action.

To carry out the foregoing object, control methods and means are provided in which one operating characteristic of the plant, for example, the speed of the gas consumer, simultaneously controls two or more other operating characteristics, for example, the gas supply to the gas consumer and the supply of one or more operating mediums, for example, the fuel and/or the combustion air, to the compressor motor, or in which one operating characteristic, for example, the supply of operating medium to the motor-compressor, is controlled simultaneously and jointly by two or more other operating characteristics, for example, the speed of the gas consumer and a condition, for example, the pressure of the operating gas.

Further and other objects of the present invention will be hereinafter set forth in the accompanying specification and claims and shown in the drawings which, by way of illustration, show what I now consider to be preferred embodiments of my invention.

In the drawings:

Fig. 1 is a diagram showing, at various output conditions, the gas production of a floating piston compressor motor and the gas consumption of a gas turbine operated by gas produced in said motor.

Fig. 2 shows indicator diagrams of the floating piston compressor motor at various operating conditions.

Fig. 3 shows indicator diagrams of the floating piston compressor at various operating conditions.

Fig. 4 is a diagrammatic showing of a plant and control mechanism according to my invention.

Fig. 5 is a diagrammatic showing of a modified plant and control mechanism according to my invention.

Fig. 6 is a diagrammatic showing of another modification of a plant and control mechanism according to my invention.

Fig. 7 is a diagrammatic showing of a further modification of a control mechanism according to my invention.

Fig. 8 is a diagrammatic showing of a control mechanism according to my invention.

Fig. 9 is a diagrammatic showing on a large scale of a detail of the control mechanisms shown in Figs. 8, 10, 11, and 12.

Fig. 10 is a diagrammatic showing of a control mechanism according to my invention.

Fig. 15 is a diagrammatic showing of a control mechanism according to my invention by which control methods shown in Figs. 4 and 14 are combined.

Fig. 16 is a diagrammatic showing of a control mechanism according to my invention by which control methods shown in Figs. 7 and 12 are combined.

Fig. 17 is a diagrammatic showing of a control mechanism according to my invention by which control methods shown in Figs. 4, 7, and 10 are combined.

Fig. 18 is a diagrammatic showing of a control mechanism according to my invention by which control methods shown in Figs. 4, 7, and 14 are combined.

Fig. 19 is a diagrammatic showing of a plant and control mechanism according to my invention, whereby the temperature of the operating gases produced in the floating piston motor is maintained above a predetermined value by controlling the air admission to the combustion motor.

Fig. 20 is a diagrammatic showing of a modification of the plant shown in Fig. 4.

Figure 11:
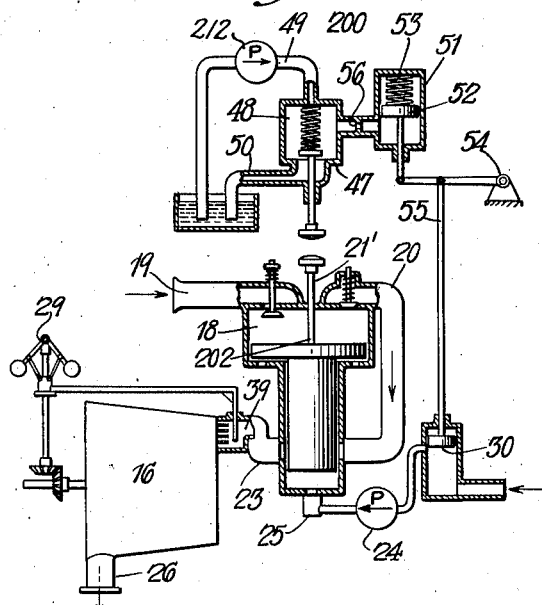
Fig. 11 is a diagrammatic showing of a control mechanism according to my invention.

Fig. 21 is a diagrammatic showing of a united plant according to my invention comprising a floating piston compressor motor producing operating gas for a gas turbine and compressed air for a reciprocating combustion engine operating a crank shaft and cooperating with said turbine for producing power for further use, and a control mechanism for controlling the operation and output of the united plant.

Referring more particularly to the diagram Fig. 1 of the drawings, curve 1 represents the volumes of gas produced at various power outputs in a combined internal combustion engine and compressor plant having floating pistons, the abscissae of the diagram representing the power output in H. P. or kw. of the combined engine and compressor, and the ordinates representing the gas volumes flowing, for example, per second through the plant. Curve 2 shows the gas consumption at various power outputs of a gas turbine driven by the gas produced in the combined internal combustion engine compressor plant having floating pistons; the abscissae indicate the power output of the gas turbine. At a power output $N_1$, curves 1 and 2 intersect one another. At this output, pressure and volume of the operating gas produced by the unified internal combustion engine and compressor plant is the same as is the pressure and volume of the gas consumed by the gas turbine. At a reduced power output $N_2$, the volume of gas produced amounts to the one indicated by ordinate $V_2$, whereas the gas consumption of the turbine is only as indicated by ordinate $V_1$. Lines 3, 4 and 5 in Fig. 1 are lines of equal pressure. Whereas the gas turbine requires the operating gas at a pressure $p_2$ indicated by line 4 when producing power as indicated by $N_2$, the unified internal combustion engine and compressor plant produces the gas at a lower pressure $p_1$ indicated by line 3.

Fig. 2 shows indicator diagrams at two different power outputs of the internal combustion engine having floating pistons. The abscissae represent the stroke of the pistons, the ordinates the pressure in the combustion cylinder. The area enclosed by the solid line diagram represents the power output at one to-and-fro stroke of the internal combustion engine corresponding to the output designated by $N_1$ in Fig. 1. The area enclosed by the dotted line diagram represents the output at one to-and-fro stroke of the engine corresponding to operating conditions designated by $N_2$ in Fig. 1. In unified internal combustion-compressor engines of the floating piston type, the piston speed and, consequently, the number of piston strokes per time unit is determined by the medium pressure in the power cylinders and is therefore also in proportion to the work done at one stroke. For this reason, also the power output which is determined by the product of work done at one stroke and the number of strokes per minute is directly coordinated to the work done at one stroke, and there is only one power output possible at a given work per stroke. In order to change over to another operating condition, it is necessary that, besides the control of the work per stroke of the power part of the unified internal combustion-compressor engine, for example, by reduction of the fuel admission, also the exhaust be controlled as to amount, pressure, temperature, distribution, or other characteristic. By such control, the point where line 1 intersects abscissa $N_2$ of diagram Fig. 1 can be made the same as the point where line 2 of this diagram intersects the abscissa $N_2$.

Fig. 3 shows indicator diagrams of the compressor part of the unified internal combustion-compressor engine. The solid line diagram 6 shows an output of the compressor necessary to produce the condition at the point of intersection of lines 1 and 2 in Fig. 1. The dash and dot line diagram 7 in Fig. 3 having the corners $a, i, g, h$ indicates the output of the compressor when producing the condition indicated by the intersection of line 1 of diagram Fig. 1 when producing a power in the internal combustion part of the unified engine designated by $N_2$ in Fig. 1. The two diagrams 8 and 9 show the conditions when producing the condition indicated by line 2 in Fig. 1 when producing a power output as per abscissa $N_2$ in Fig. 1. If, by changing the fuel admission to the power cylinder, the work per stroke of the power piston is reduced from the one shown by the solid line diagram 306 in Fig. 2 to the one shown by the dotted line diagram 307 in the same figure, the pressure in the compressor cylinders is reduced from $p_{3'}$, in Fig. 3 to $p_{1'}$. If, at such change of output of the power cylinder, the clearance 12 in the compressor cylinders remains the same, the volumetric efficiency of the air compressor corresponds to line 10 in Fig. 3. At this condition, however, too much air is supplied and, consequently, too much exhaust gas is produced. By increasing the clearance from the value shown by the distance 12 to the value indicated by distance 13, the volumetric efficiency is reduced to the one indicated by line 11, and solid line compressor diagram 8 having the corners $a, b, c, d$ results in which the air is compressed to pressure $p_{2'}$. At this condition, an exhaust gas volume designated by $V_1$ in Fig. 1 is available.

If the control of the compressor part is done by throttling the air admitted to the compressor cylinders, an operating condition shown by dotted line diagram 9 in Fig. 3 having the corners a, b, e, f is produced at the same clearance, namely, the one indicated by distance 12. The compression then starts at a pressure below the atmospheric pressure and continues up to pressure $p_{2'}$. The volumetric efficiency shown by distance 14 corresponding to diagram 9 measured on the basis of atmospheric pressure is equal to the one shown by distance 11. The operating conditions of the floating piston compressor producing indicator diagrams 8 and 9 have been changed in both cases in such a manner that the production of exhaust gas, i. e., operating medium for a gas turbine or the like is changed from the one corresponding to the intersection of line 1 in Fig. 1 with the abscissa $N_2$ to one corresponding to the intersection of line 2 in Fig. 1 with the abscissa $N_2$.

Fig. 4 diagrammatically shows a unified internal combustion-compressor engine having floating pistons 15, the exhaust gases of the engine being used for operating a gas turbine 16. Floating pistons 15 each have a power part operating in power cylinder 17 and a compressor part operating in compressor cylinders 18. The compressors are single acting and receive air through inlet 19; the compressed air is discharged through conduit 20 into the power cylinder 17 where it serves as combustion air. The exhaust gases leave power cylinder 17 through exhaust conduit 23 and are conducted into gas turbine 16. Fuel is supplied to power cylinder 17 by means of fuel pump 24 and nozzle 25.

After expansion, the gas operating gas turbine 16 exits through discharge conduit 26. Turbine 16 operates shaft 27 and, by means of bevel gears 28', the speed governor 29.

In the plant according to Fig. 4, the work per stroke of the floating piston internal combustion-compressor engine is controlled by an operating characteristic of the consumer, namely, the speed of gas turbine 16. This is accomplished by connecting fuel valve 30 to speed governor 29 by means of connecting gear 31. Upon increase of the speed of the gas turbine 16 less fuel is supplied to power cylinder 17, and the number of strokes per minute of the floating pistons 15 is also reduced.

Line 1 in Fig. 1 shows that, at a reduction of the output from $N_1$ to $N_2$, the volumetric output is reduced to the one indicated by ordinate $V_2$, and the pressure $p_3$ is reduced to $p_1$. Since the volumetric output $V_2$ at the pressure $p_1$ does not conform with the requirements of the turbine 16 which are indicated by line 2 in Fig. 1, the work done by compressor 18 is also made dependent on the speed of the turbine 16. For this purpose, speed governor 29 is linked with valve 32 in inlet 19 of the compressor cylinders. At increasing speed, valve 32 is closed, and the air supply to compressor cylinders 18 is reduced. The compressors now operate according to indicator diagram 9 in Fig. 3, and the production of operating gas by the unified internal combustion-compressor engine conforms with the gas consumption of the turbine.

In Fig. 4, a return guide for the control of valve 32 is shown which is adapted to speed up the control operations, particularly if there is a large receiver or gas accumulator 85 between combustion cylinder 17 and turbine 16. In the gearing connecting speed governor 29 and valve 32 comprising elbow lever 33 and rods 90 and 91, a two arm lever 92 is arranged. One end of this lever is movably linked to connecting rod 91 and the other end to piston rod 93, whereas its center is movably connected with rod 90 which hangs on elbow lever 33 which is directly actuated by speed governor 29. Piston rod 93 is also connected to piston 94 operating in cylinder 83 which is connected to receiver 85 by means of conduit 84 so that one side of piston 94 is under the influence of the gas pressure in accumulator 85; the other side of the piston is under the influence of a spring 86.

The output of turbine 16 is not changed as long as the gas pressure at the turbine nozzles is not changed. It is, therefore, essential that the pressure in container 85 be changed quickly if the output of the turbine must be changed. Let us assume that turbine 16 speeds up, and a reduction of the output of the turbine is desired. The pressure of the operating gas must then be reduced which can be accomplished by excessively reducing the supply of exhaust gas from combustion cylinder 17. Speed governor 29 at first turns lever 92 clockwise around fulcrum 87 into the position indicated by dotted line 88. Damper 32 is thereby closed, and the output of compressors 18 is much reduced. Gas turbine 16 still takes gas from container 85, whereas the production of gas in cylinder 17 is almost stopped due to the lack of combustion air. The pressure in container 85 will, therefore, fall rapidly and faster than would be the case if speed governor 29 acted directly on valve 32 without this action being augmented by lever 92. With falling gas pressure, the output and speed of turbine 16 decreases.

The decrease of the pressure in container 85 and cylinder 83 causes piston 94 to move to the right and to move lever 92 into the position indicated by dotted line 89. Thereby valve 32 is somewhat opened again, and the excessive initial throttling of the air flow to the compressor cylinders is reduced as soon as the turbine output is reduced. The fuel supply may be controlled by a stroke governor as indicated in connection with the modifications shown in Figs. 8, 10, 11, and 12 and particularly shown in Fig. 9 instead of by the speed governor 29. Such arrangement is shown in Fig. 20 of the drawings. The free stroke internal combustion engine and compressor and its combination with receiver 85 and turbine 16 is the same as in the plant according to Fig. 4. Speed governor 29 in the plant according to Fig. 20 controls the air supply valve 32 in the same manner as the speed governor 29 in Fig. 4. The fuel admission valve 30 in Fig. 20, however, is operated by rod 55' which corresponds to rod 55 in Fig. 9 and which is linked to a lever 54' which corresponds to lever 54 in Fig. 9 and is connected to and operated by piston 52' which is responsive to the pressure of an operating medium in cylinders 48, 51, which pressure depends on the position of valve 47 which is controlled by the extent of the outward stroke of piston 15. To accomplish this, piston 15 is provided with an extension 21 which contacts with rod 47' connected to piston 47 whenever piston 15 moves sufficiently far outwards. Valve 47 is opened the more, the further piston 15 moves outwards. The fuel control according to Fig. 20 operates similarly to the fuel control shown in Fig. 9 with the one difference that there is no intermediary mechanism 60, 61, 45, 44 and the position of valve 30 therefore depends directly on the extent of the outward stroke of piston 15. After having completed their outward stroke, pistons 15 are returned inwardly by the air pressure built up during the outward stroke in air compressor cylinder 18. Of course, part of the air compressed in cylinders 18 is blown through conduit 20 into cylinder 17, but there is sufficient air left in cylinders 18 to build an air cushion which returns pistons 15 on their compression strokes.

In order to accomplish a quick reduction of the power output of turbine 16, whereby the load of the floating piston compressor motor may be changed gradually instead of the temporary excessive control according to Fig. 4, a blow-off control 161 may be provided which allows a sudden blow-off of operating gas from conduit 23 or container 85. This control may be actuated by a separate emergency speed governor 162 to which it is connected by connecting means 163.

In the embodiments of my invention illustrated in Figs. 5, 6, and 7, the work per stroke of the power piston is controlled in the same manner as is shown in Fig. 4, viz., in dependence on the speed of gas turbine 16. The output of the compressor, however, is controlled in the arrangement according to Fig. 5, in dependence on the position of floating piston 15 at the end of a stroke. For this purpose, a stroke governor 200 is provided. This consists of two internally connected cylinders 48 and 51; in cylinder 51 is a piston 52' the position of which is controlled by the pressure of an operating medium in chamber 51' which pressure counteracts that of spring 53. Chamber 51' communicates with the interior of cylinder 48 which is supplied with operating medium by means of pump 212 from a reservoir 213. The flow of operating medium through cylinder 48 is controlled by means of valve 47 which is normally held in closed position by means of spring 47". Valve 47 has a stem 47' the end of which abuts the extension 21 of piston 15 whenever this piston moves far enough outwards. The further piston 15 moves outwards, the further is valve 47 opened and the more operating medium is returned through conduit 50 to reservoir 213 and the lower is the pressure in cylinder 48 and chamber 51'. Upon reduction of the pressure in chamber 51', piston 52' moves downwards and lever 54 moves counterclockwise thereby pulling rod 55 upwards and closing air supply valve 95. This causes a reduction of air supply to cylinder 17 and a reduction of the forces moving piston 15 outwards. This is the desired result. A nozzle 56 is provided in the conduit connecting cylinder 48 and chamber 51' for fluid flow in order to withhold rapid fluctuations caused by shockwise movements of valve 47 from chamber 51' and piston 52 and the mechanism connected thereto. The mechanism operates similarly to the one shown in a larger scale in Fig. 9 with the difference that there is no intermediary mechanism 60, 61, 45, 44 and the stroke of piston 15, through piston 52', acts directly on combustion air supply control means 95, whereas in Fig. 9 the stroke of piston 15 acts indirectly, through piston 52, on the fuel supply control means 30. The mechanism according to Fig. 9 will be described later in detail. The stroke governor controls throttle valve 95 in conduit 20 and thereby the back pressure of the compressor and the pressure of the combustion and scavenging air for combustion cylinder 17. At a reduction of the work per stroke of the compressor piston, the position of this piston at the end of a stroke is closer to cylinder 17, and the clearance in compressor 18 becomes larger. In this case, stroke governor 200 opens damper 95, whereas, if the clearance is reduced, damper 95 is closed so that a clearance designated by 13 in Fig. 3 is maintained.

With a control method according to Figs. 4 and 5, gas turbine 16 can be made very simple because there is no complicated nozzle control or the like required.

Fig. 6 shows a method of controlling gas turbine 16 which is operated by gas produced in a unified internal combustion-compressor engine having floating pistons. The amount of the operating medium of the gas turbine is in a certain relation to the pressure of the operating medium. This relation depends on the method of controlling the floating piston engine. It is possible that, at increased output, the amount of gas produced is reduced. In such cases, it is necessary to reduce the admission area to the gas turbine at increasing load and to increase the area for gas admission at decreasing load.

In the embodiment of my invention shown in Fig. 6, the turbine driven by the exhaust gases of cylinder 17 consists of a high pressure stage 16' and a low pressure stage 16" which is normally operated by the gas exhausted from the high pressure stage 16' of turbine 16; gas conduit 23 is provided with a pressure sensitive device 34 which actuates valve 35 arranged in gas pipe 36 which is connected to conduit 23, by-passes the high pressure stage 16' of turbine 16, and supplies gas directly to low pressure stage 16" of turbine 16. The control of the work per stroke of the power piston in cylinder 17 is done in dependence on the speed of turbine 16 in the same manner as was described in connection with Fig. 4. If the speed of the turbine increases, the fuel supply to cylinder 17 is reduced. The work per stroke is reduced and so is the number of strokes per minute, so that the pressure of the air delivered by compressor 18 and that of the operating gas in conduit 23 is reduced. At falling pressure in conduit 23, piston 38 moves to the right and opens valve 35 by means of gear 37, and low pressure operating gas which could not be used in the high pressure stage of the gas turbine is conducted into the low pressure stage. In the control method illustrated in Fig. 6, the gas supplied to and the gas distribution in turbine 16 is controlled in such a manner that point C in the diagram Fig. 1 assumes the position of point B. At increasing demand of power from turbine 16, the speed of the turbine decreases and the control operations take place in opposite direction from those described in the foregoing, valve 35 being closed and more operating gas being introduced into the high pressure stages of the turbine.

For sudden and emergency control, a valve 35' may be arranged and adapted to direct the operating medium either into the high pressure part 16' or into conduit 36. This valve may be controlled by emergency governor 162 to which it is connected by connecting means 164.

In the embodiment of my invention according to Fig. 7 of the drawings, admission of operating medium to the turbine is controlled in accordance to the speed of the turbine. Speed governor 29 controls nozzle regulator 39 by means of gear 40. At increasing speed, more nozzles are opened, and a larger volume of operating gas passes the turbine at lower pressure. This control method effects the moving of point C in line 2 in Fig. 1 into the position of point B as is the case with the method described in connection with Fig. 6.

When the speed of the turbine is reduced, the admission area to the turbine is reduced so that, at larger power output of the turbine, a smaller amount of operating gas enters the turbine at much increased pressure.

With a control method as illustrated in Figs. 6 and 7, high over-all operating efficiency is assured also at partial loads, and the fuel consumption per power unit generated is small also at small outputs.

In the embodiment of my invention according to Figs. 5, 8, 10, 11, and 12, the work per stroke of the power piston in combustion cylinder 17 is controlled in dependence on the position of the floating piston 15 at the end of a stroke by means of a stroke regulator 200.

Stroke regulator 200 is shown in detail in Fig. 9. In order to simplify the showing, the drive of the regulator is combined with that of the fuel pump and shown as being actuated by an extension 21 at the compressor end of the floating piston 15 in contradistinction to the schematic showings of Figs. 10, 11, and 12 in which the stroke regulator is operated by means of a lateral protrusion of the floating piston 15. Referring more particularly to Fig. 9, a lever 41 is linked to the compressor end of floating piston 15 which operates piston 42 of fuel pump 24. Fuel pump 24 delivers into conduit 24' to which the fuel injection valve 24" is directly connected. When piston 15 makes an expansion stroke lever 41 moves counter-clockwise and piston 42 moves upwards thereby drawing fuel oil into the pump cylinder. When piston 15 makes a compression stroke, i. e. moves upwards as seen in Fig. 9, lever 41 moves clockwise and forces piston 42 downwards whereby fuel oil is forced into conduit 24' and thence through valve 24" is injected into the power cylinder 17. At the end of an expansion stroke of the power piston, roller 43 at the end of lever 41 abuts against key 44 of lever 45 which operates pressure control valve 47. This valve operates within casing 48 which is provided with a pressure fluid inlet 49 which is supplied by pump 212 taking the fluid from well 213 and a pressure fluid outlet 50 which returns the fluid to well 213. To casing 48, cylinder 51 having piston 52 is connected for fluid flow, piston 52 being actuated on one side by the pressure fluid in casing 48 and cylinder 51 and, on the other side, by a spring 53. Piston 52 operates two arm lever 54 by means of a connecting rod connected to the piston and linked to one end of two arm lever 54. To the other end of this lever, rod 55 is linked which operates the fuel admission valve 30.

At small output of the internal combustion-compressor engine, the position of the floating piston at the end of an expansion stroke of the power piston is far down, as seen in Fig. 9, and valve 47 is opened wide reaching the position indicated by I in Fig. 9. The admission of pressure fluid to the stroke regulator 200 through inlet 49 is constant, and much fluid is allowed to escape from casing 48 through outlet 50. Pressure control valve 47 is closed when roller 43 is lifted from key 44 at an inward stroke of the floating piston. The opening period of valve 47 is short as compared with the stroke of the floating piston. The amount of pressure fluid leaving casing 48 depends on the length of time and the extent of opening of valve 47, and the pressure in casing 48 and cylinder 51 depends on the amount of pressure fluid relieved through outlet 50.

At a large stroke of pressure regulating valve 47, for example, to the position indicated by dash and dot line I, the pressure in cylinder 51 is low; at a small stroke, for example, to the position indicated by line II, the pressure is high; the position of piston 52 is changed in accordance with the changes of the pressure in cylinder 51. At low pressure, the position of piston 52 is as indicated by line III and corresponds to position I of valve 47, and fuel supply to pump 24 is reduced, whereas, at position IV of piston 52 corresponding to position II of valve 47, which causes high pressure in cylinder 51, the fuel supply is increased. A damping throttle 56 is provided in the conduit connecting casing 48 and cylinder 51, whereby pressure fluctuations caused by the individual strokes of the floating piston are withheld from piston 52 which assumes a position corresponding to the medium of the individual pressure variations.

Stroke regulator 200 controls the fuel supply in dependence on the positions of piston 15 at the end of the strokes in order to balance work per piston stroke and compression work. The end position of the compressor piston at little work done by the compressor is indicated by dash and dot line V and, at great work done, by dotted line VI.

In the embodiment of my invention according to Fig. 8 of the drawings, the end position of floating piston 15 is controlled in dependence on the speed of gas turbine 16 in order to control the output of compressor 18. At increasing speed, speed governor 29 pushes lever 61 (Fig. 9) to which it is connected by rod 60 to the right and also key 44 which is linked to lever 61. Roller 43 now contacts with key 44 at a position which is closer to combustion cylinder 17 and opens pressure regulating valve 47. At the same adjustment of the fuel supply, i. e., at the same position of piston 52 and at the same pressure in casing 48, the position at the end of an expansion stroke of piston 15 now, for small output, coincides with the one indicated by line VII in Fig. 9 instead of with the one indicated by line V. At this end position, the clearance in the compressor cylinder is larger than at the position designated by line V. By this change, the volumetric efficiency of compressor 18 is reduced and the output of the compressor adjusted according to the reduced consumption of turbine 16.

In the embodiment of my invention according to Fig. 10, the output of compressor 18 is made directly dependent on an operating characteristic of the apparatus consuming the operating medium produced in the unified internal combustion-compressor engine. When the speed of turbine 16 increases, speed governor 29 opens, by means of gearing 63, valve 66 which permits compressed air to escape through conduit 64. The pressure in compressed air conduit 20 is thereby reduced, and the excess of scavenging air is also reduced; amount and pressure of the exhaust gas of combustion cylinder 17 are also reduced. Due to the reduction of compression work done in cylinder 18, floating piston 15 moves further outwards which causes a decrease of the fuel supply because of stroke governor 200.

Figure 12:
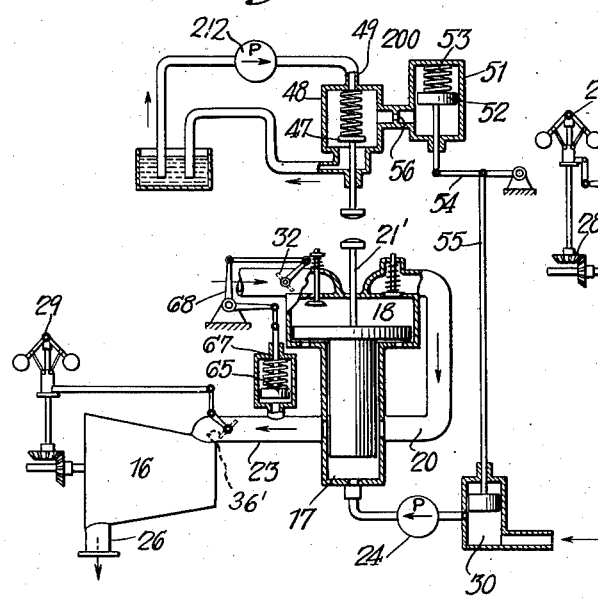
Fig. 12 is a diagrammatic showing of a control mechanism according to my invention.

In the embodiment of my invention according to Figs. 10, 11, and 12, member 21' which corresponds to member 21 in Figs. 5 and 9 is arranged outside of the cylinders and connected to a member 201 which laterally projects from piston 15 and moves in a slot 202 in power cylinder 17, as is illustrated in detail in Fig. 10.

In the embodiment of my invention according to Fig. 11, speed governor 29 increases, at increasing speed, the area admitting operating gas to gas turbine 16 in a manner similar to that described in connection with Fig. 7. Consequently, the pressure in conduits 20 and 23 and in compressor 18 is reduced. The position of the floating piston at the end of an expansion stroke of the power piston is moved further out so that stroke governor 200 reduces the admission of fuel.

If the control method according to Fig. 11 is used in connection with a plant comprising several floating piston compressor motors and gas turbines which all have a common conduit corresponding to conduit 23 for the operating gas, the individual machines are self contained and independent from one another with respect to their control, and the individual machines may be locally separated without requiring expensive, complicated, and long control conduits for interconnection. The individual control apparatuses are very simple.

In the embodiment of my invention according to Fig. 12, not only the area admitting operating gas to turbine 16, namely, valve 36', but also the area admitting air to compressor 18, namely, valve 32 is controlled. The latter is controlled in dependence on the pressure of the operating gas in conduit 23; this pressure actuates piston 65 in pressure sensitive device 67 which closes valve 32 by means of gearing 68 whenever the pressure in conduit 23 goes down. Hereby an operating condition is obtained which lies in between the one designated by point B and the one designated by point C in Fig. 1. Stroke governor 200 reduces the admission of fuel upon a reduction of the work of the compressor as is the case in the arrangement shown in Fig. 11.

Figure 13:
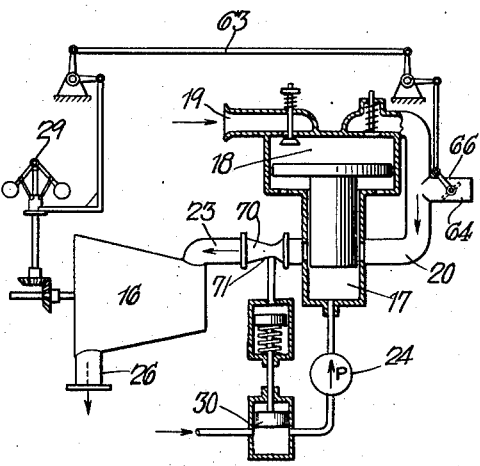
Fig. 13 is a diagrammatic showing of a control mechanism according to my invention.
Figure 14:
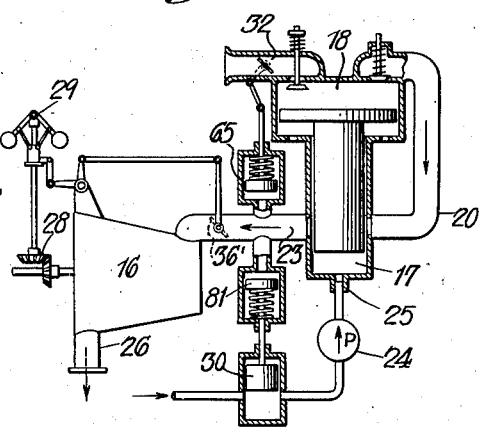
Fig. 14 is a diagrammatic showing of a control mechanism according to my invention.

In the embodiments of my invention shown in Figs. 13 and 14, the work per stroke of the power piston is controlled in dependence on an operating condition in gas conduit 23.

In the arrangement illustrated by Fig. 13, the fuel supply to power cylinder 17 is made dependent on the pressure of the gas passing through conduit 23 and thereby on the amount of gas passing through turbine 16. This pressure is measured by Venturi tube 70. The pressure on the throat 71 of the tube is used for adjusting the fuel supply valve 30. Speed governor 29 opens valve 66 and reduces the back pressure of compressor 18 and also the supply of scavenging air and the amount of operating gas produced in combustion cylinder 17 in the same manner as was described in connection with Fig. 10. A reduction of operating gas causes a closing of valve 30 and a reduction of fuel supply to cylinder 17.

In the arrangement shown in Fig. 14, the fuel supply is made dependent on the gas pressure in conduit 23 which acts on piston 81 which actuates fuel supply valve 30. The air supply to compressor 18 is also made dependent on the gas pressure in conduit 23. This pressure acts on piston 65 which is connected to and actuates air admission valve 32. Upon an increase of speed, speed governor 29 closes the gas admission to the turbine by closing valve 36' which causes a rise of the pressure in conduit 23. Due to the increase in pressure, air admission valve 32 and fuel admission valve 30 are closed.

In the arrangement illustrated in Fig. 15, fuel supply to combustion cylinder 17, air supply to compressor 18, and gas supply to turbine 16 are all controlled by means of speed governor 29 of turbine 16. If the speed goes up, this governor closes fuel supply valve 30 to which it is connected through gear 31, gas supply valve 36' to which it is connected by gear 35, and air supply valve 32 to which it is connected by means of gears 35 and 91'.

In the arrangement shown in Fig. 16, the fuel supply to combustion cylinder 17 and the number of turbine nozzles admitting operating gas to turbine 16 is controlled by speed governor 29. If the speed increases, this governor closes fuel supply valve 30 to which it is connected by means of gear 31 and increases the number of nozzles admitting gas to turbine 16 by operating nozzle control 39 to which it is connected by gear 40. Upon an enlargement of the gas passage through turbine 16, the pressure in conduit 23 goes down which causes a closing of valve 32 in the same manner as was described in connection with Fig. 12.

The control method according to Fig. 17 provides for a nozzle control of turbine 16 in the same manner as does the method illustrated by Figs. 7, 11, 12, and 16. In addition, speed governor 29 closes, upon an increase of speed, damper 32 controlling the admission of air to compressor 18. For this purpose, governor 29 is connected with damper 32 by means of connecting rod 165, bell crank lever 166, and rod 167. The fuel supply is controlled in dependence on the position of floating piston 15 at the end of a stroke in a manner similar to the one shown in Fig. 9; roller 43, however, acts directly on the stem 168 of valve 47.

In the control method shown in Fig. 18, speed governor 29 operates nozzle control 39 for controlling the passage of gas through turbine 16 and air admission valve 32 for controlling the air supply to compressor 18. For this purpose governor 29 is connected with control means 39 by means of gear 40 and with valve 32 by means of gear 91''. Upon enlargement of the gas passage through turbine 16, the gas pressure in conduit 23 goes down which causes piston 81 to move upwards under the influence of spring 169. To piston 81 fuel oil valve 30 is connected which reduces the fuel supply to pump 24, feeder 25, and combustion cylinder 17 upon an upward movement of piston 81.

Fig. 19 shows another embodiment of my invention. 101 is a unified internal combustion-compressor engine having a power cylinder 102 extending at both ends into a compressor cylinder 103 and a pair of floating pistons 104 each consisting of a power and a compressor part. Both floating pistons may be operatively connected by a mechanical coupling in order to assure synchronized counter-movement of the pistons. The coupling consists of three two-arm levers 250, 251, and 252 which are interconnected by connecting rods 253 and 254; the arm of lever 250 which is not connected by rod 253 to one arm of lever 251 is connected to the upper piston 104 which, for this purpose, carries an extension 255. The arm of lever 252 which is not connected by rod 254 to the other arm of lever 251 is connected with the lower piston 104 by means of extension 256. In the machine shown in Fig. 19, the pistons 104 are moved inwards by means of the air pressure created during the outward stroke of pistons 104 in the outer chambers of cylinders 103 and, particularly, in the small cylinders attached for this purpose to the larger cylinders 103. The air compressed in cylinders 103 is conducted through conduit 105 into power cylinder 102. The combustion gases exhausting from cylinder 102 are conducted through conduit 109 into gas turbine 114 which operates the electric generator 115. Fuel is supplied to admission valve 113 of cylinder 102 by means of pump 110, the plunger 111 of which is operated by key 112 which is connected to and reciprocates with a floating piston 104. Valve 113 is opened against the pressure of spring 113'. Speed governor 117 driven by the shaft of gas turbine 114 controls the operation by means of bell crank lever 118 and connecting rod 119, of fuel control means 120 which, in the example shown in Fig. 19, is a by-pass valve driven by the plunger 111 permitting, when opened, return of fuel oil from pressure conduit 116 to suction conduit 108. At decreasing power demand, i. e., increasing speed of turbine 114, governor 117 opens valve 120 and decreases the fuel supply to cylinder 102. At increasing power demand, by-pass valve 120 is closed.

At increasing speed of turbine 114, the pressure and temperature of the operating gas in conduit 109 decreases due to the reduction of fuel. The interior of conduit 109 is connected with the interior of control cylinder 122 by means of conduit 121. Cylinder 122 contains a piston 123 which, on one side, is acted on by spring 125 and, on the other side, by gas pressure. If the latter decreases, piston 123 moves to the left away from abutment 124. This movement is transmitted to damper 126 in the air relief socket 129 by means of gear 127. At a movement to the left of piston 123, valve 128 is opened, and the air supply to cylinder 102 is reduced. At a reduced air supply and unchanged fuel supply, the gas temperature in conduit 109 would go up. The combined air and fuel control as described assures constant temperature of the gas operating turbine 114. The gas pressure in conduit 109 and, with it, the gas temperature can be adjusted by adjustment of the tension of spring 125 by means of adjusting screw 130.

The maintenance of a constant flue gas temperature at all output conditions is of great importance in plants as described for the following reasons:

In united floating piston combustion and compressor engines, the flue gases of which are used for operating a gas turbine or the like, the pressure and temperature of the gases at full load conditions are high due to high pressure and great admission of the combustion cylinder, and the apparatus consuming the gases, i. e., the gas turbine must be able to withstand high temperatures.

The gases exhausting from the combustion cylinder carry hydrocarbons, particularly unburned lubricating oil. At full load conditions, the gas temperatures are so high that such residues are burned up in the combustion cylinders and exhaust conduits. At small loads, however, the gas temperature falls below the ignition temperature of these residues which then accumulate in the exhaust gas conduits and accumulators. If the load is then increased, the gas temperature, too, increases and reaches the ignition temperature of the residues which suddenly burn up and develop a great amount of heat which cannot be absorbed by the comparatively small amount of gas in the exhaust gas conduits and, therefore, cause a sudden and extensive rise of the gas temperature which is harmful to the turbine blading etc.

Improper operation of the air compression in the combustion cylinders may also cause great amounts of unburnt matter in the gases operating the turbine, which matters accumulate in the gas conduits. As soon as the improper operation of the air compression, which may be due to improper working of a valve, is brought back to normal condition, the high gas temperature may cause ignition of the accumulated unburnt matter and undue temperature of the gases operating the gas turbine.

If the temperature of the gas operating the turbine is maintained at all loads, the clearances in the gas turbine can be made small, and additional clearance losses at partial loads which are otherwise caused by the cooling down of the respective turbine parts and widening of the clearances are avoided.

The floating piston motor-compressor plant according to Fig. 21 comprises, besides motor-compressor 101, a combustion engine 170 having a crank shaft 150 which drives, by means of gears 171, gas turbine 114 and electric generator 115. Combustion engine 170 is supplied with combustion air from air conduit 161 which receives air from air compressors 103. The exhaust gases from engine 170 as well as motor compressor 101 are conducted through conduit 152 into and operate gas turbine 114. The output of the whole plant is controlled by means of speed governor 117 which is connected by bell crank lever 118 and rod 119 with bell crank lever 153 which controls, by means of rod 154, the fuel supply valve 160 as well as the air damper 172 in suction conduit 173 of compressors 103. At decreasing power demand, the speed of turbine 114 goes up, and speed governor 117 closes damper 172 and fuel valve 160.

The fuel supply to combustion engine 170 is controlled in dependence on an operating condition which is characteristic for the consumption of operating gas; in the case illustrated in Fig. 21 in dependence on the pressure in compressed air conduit 151. For this purpose, a cylinder 176 is connected with conduit 151 and contains a piston 175, on one side of which the pressure of the compressed air acts and on the other side a spring 177. The position of piston 175 within cylinder 176 depends on the air pressure in conduit 151. Piston 175 adjusts the output of the fuel oil pump 180 supplying fuel oil to combustion engine 170. For simplicity's sake, a rod 179 is shown in Fig. 21 carrying piston valve 178 which admits more fuel to engine 170 the higher the pressure of the combustion air in conduit 151 is.

At small power demand of generator 115, turbine 114 speeds up, and fuel and air supply to floating piston motor-compressor 101 is reduced. Due to the smaller output of motor-compressor 101, its number of strokes per minute and also the pressure and amount of air supplied by the compressors 103 are reduced. Thereupon the pressure in conduit 151 drops, and piston 175 moves upwards closing valve 178 and reducing the fuel supply to engine 170. Consequently, amount and pressure of the operating gas in conduit 152 and the output of turbine 114 are decreased. The output of engine 170 is also reduced, and the combined power supplied by engine 170 and turbine 114 conforms with the reduced power demand of generator 115.

The influence of the speed governor on fuel admission control 160 and on air admission control 172 can be adjusted, adjusting shackles 161 and 162 being provided for this purpose. In order to prevent a drop of the temperature of the operating gas in conduit 152, the proportion of fuel supply to motor-compressor 101 with respect to that to combustion engine 170 is so adjusted that, at small loads, engine 170 takes a greater portion of the total load than at larger outputs. Coil spring 177, which, at the beginning of the compression by low pressures, is further compressed than at further compression and high pressures, contributes to this.

While I believe the above described embodiments of my invention to be preferred embodiments, I wish it to be understood that I do not desire to be limited to the exact details of method, design and construction shown and described, for obvious modifications will occur to a person skilled in the art.

It is obvious, for example, that the individual control methods described may be combined so as to act simultaneously or successively, all for the purpose of coordinating the curve 1 and 2 in Fig. 1 in a manner which best suits the purposes for which the plants are used.

What I claim is:

1. The method for controlling the output of plants comprising a floating piston compressor motor producing an operating gas and a gas consumer for consuming said operating gas, said method consisting in controlling the amount of air supplied to said compressor motor in dependence on the load on said gas consumer and in simultaneously controlling the operating gas supplied to the consumer also in dependence on the load on said consumer, whereby coincidence of volume and pressure of the gas exhausted from said compressor motor and of the gas operating said consumer is assured at all load conditions of the plant.

2. In a power plant comprising an internal combustion free stroke motor compressor, a gas turbine connected to and operated by exhaust gases of said motor compressor, the combination of means responsive to the load conditions of said turbine with two control means, one controlling the air supply to said motor-compressor, the other simultaneously controlling the exhaust gas supply to said turbine, whereby coincidence of volume and pressure of the gas exhausted from said motor-compressor and of the gas operating said turbine is assured at all load conditions of the plant.

3. The method for controlling the output of plants comprising a floating piston compressor motor producing an operating gas and a gas consumer consuming said operating gas, said method consisting in the combination of controlling the production of operating gas per stroke of a power piston of said floating piston compressor motor in dependence on the length of the stroke of said power piston and of simultaneously controlling the supply of operating gas to said consumer in dependence on the load in said consumer, whereby the volume and pressure of the gas produced coincides with the volume and pressure of the operating gas demanded by said consumer at various load conditions.

4. The method for controlling the output of plants comprising a floating piston compressor motor producing an operating gas and a gas consumer consuming said operating gas, said method consisting in the combination of controlling the amount of fuel supplied to said motor per stroke of a power piston of said floating piston compressor motor in dependence on the length of the stroke of said power piston and of simultaneously controlling the amount of air supplied to said compressor in dependence on the pressure of said operating gas, whereby gas production and gas consumption are definitely coordinated.

5. The method for controlling the output of plants comprising a floating piston compressor motor producing an operating gas and a gas consumer for consuming said operating gas, said method consisting in the combination of controlling the amount of fuel supplied to said motor per stroke of a power piston of said floating piston compressor motor in direct dependence on the length of the stroke of said power piston and in simultaneously controlling the production of the operating gas by controlling the air output of the compressor in direct dependence on the load in said consumer, whereby gas production and gas consumption are definitely co-ordinated.

6. The method for controlling the output of plants comprising a floating piston compressor motor producing an operating gas and a consumer operated by said gas, said method consisting in the combination of controlling the air output of said compressor in dependence on the pressure of the operating gas and in dependence on the load on the consumer.

7. The method for controlling the output of plants comprising a floating piston compressor motor producing an operating gas and a consumer operated by said gas, said method consisting in simultaneously controlling the passage of operating gas through said consumer and the supply of operating medium to said motor in direct dependence on the load on said consumer.

8. The method for controlling the output of plants comprising a floating piston compressor motor producing an operating gas and an engine operated by said gas, said method consisting in controlling the fuel supply to said floating piston compressor motor in dependence on the position of a floating piston at the end of a stroke and in controlling the air output of said compressor in direct dependence on the speed of the engine driven by said operating gas.

9. The method for controlling the output of plants comprising a floating piston compressor motor producing an operating gas and an engine operated by said gas, said method consisting in the combination of controlling the fuel supply to said floating piston compressor motor in dependence on the position of a floating piston at the end of a stroke, in controlling the air flow through said compressor in dependence on the pressure of operating gas, and in controlling the passage of operating gas through the engine in dependence on the speed of said engine.

10. The method for controlling the output of plants comprising a floating piston compressor motor producing an operating gas and a consumer operated by said gas, said method consisting in controlling the gas output of said floating piston compressor motor in dependence on the pressure of the operating gas and simultaneously in direct dependence on the load on said consumer.

11. The method for controlling the output of plants comprising a floating piston compressor motor producing an operating gas and a consumer operated by said gas, said method consisting in controlling the output of said compressor and the supply of operating medium to said floating piston compressor motor and the admission of operating gas to said gas consumer simultaneously and in direct dependence on the load on said consumer.

12. The method for controlling the output of plants comprising a floating piston compressor motor producing an operating gas and a consumer operated by said gas, said method consisting in controlling the supply of operating medium to said floating piston compressor motor in direct dependence on the load on said consumer, in simutlaneously controlling the output of the compressor in dependence on the pressure of said operating gas, and in controlling simultaneously the supply of operating gas to said consumer in dependence on the load on said consumer.

13. The method for controlling the output of plants comprising a floating piston compressor motor producing an operating gas and a consumer operated by said gas, said method consisting in controlling the supply of operating medium to said floating piston compressor motor in direct dependence on the load on said consumer and simultaneously in dependence on the pressure of said operating gas, whereby an excessive controlling action is counterbalanced by the action of the pressure of said operating gas.

14. In a plant comprising an internal combustion reciprocating motor having a floating piston which has a compressor piston operating in a compressor cylinder directly connected thereto, said compressor cylinder being air conductingly connected with and adapted to supply compressed combustion air to said motor, a gas motor gas conductingly connected with and adapted to consume the exhaust gases of said combustion motor, the combination of fuel supply means connected for fuel flow with said motor, with control means connected with said fuel supply means adapted to abuttingly cooperate with said floating piston and to control the fuel supply to said combustion motor in dependence on the position of said floating piston at the end of a stroke, whereby the length of the stroke of said floating piston is substantially maintained, speed responsive means connected with said gas motor and with air flow control means connected with said compressor cylinder and with said speed responsive means for controlling the flow of air through said cylinder in dependence on the speed of said gas motor.

15. In a plant comprising an internal combustion reciprocating motor having a floating piston which has a compressor piston operating in a compressor cylinder directly connected thereto, said compressor cylinder being air conductingly connected with and adapted to supply compressed combustion air to said motor, fuel supply means connected for fuel flow with said motor, a gas motor, a gas conduit connecting said combustion motor and said gas motor for conducting exhaust gases of said combustion motor to said gas motor for operating said gas motor, the combination of control means connected with said fuel supply means adapted to abuttingly cooperate with said floating piston and to control the fuel supply to said combustion motor in dependence on the position of said floating piston at the end of a stroke, whereby the length of the stroke of said floating piston is substantially maintained, with speed responsive means connected with said gas motor, pressure responsive means connected with said gas conduit, and with air control means connected with said compressor cylinder and with said speed responsive means and with said pressure responsive means for controlling the flow of air through said cylinder in dependence on the speed of said gas motor and at the same time on the gas pressure in said gas conduit.

16. In a plant comprising an internal combustion reciprocating motor having a floating piston which has a compressor piston operating in a compressor cylinder directly connected thereto, said compressor cylinder being air conductingly connected with and adapted to supply compressed combustion air to said motor, operating medium supply means connected with said combustion motor for supplying a medium for operating said motor, a gas motor, a gas conduit connecting said combustion motor and said gas motor for conducting the exhaust gases of said combustion motor to said gas motor for operating said gas motor, the combination of speed responsive means connected with said gas motor and with said operating medium supply means, with pressure responsive means connected with said conduit and also with said operating medium supply means for controlling the supply of operating medium to said combustion motor in dependence on the speed of said gas motor and simultaneously also in dependence on the pressure of the gas operating said gas motor.

17. In a plant comprising an internal combustion reciprocating motor having a floating piston which has a compressor piston operating in a compressor cylinder directly connected thereto, said compressor cylinder being air conductingly connected with and adapted to supply compressed combustion air to said motor, operating medium supply means connected with said combustion motor for supplying a medium for operating said motor, a gas motor, a gas conduit connecting said combustion motor and said gas motor for conducting the exhaust gases of said combustion motor to said gas motor for operating said gas motor, the combination of speed responsive means connected with said gas motor and with said operating medium supply means, with pressure responsive means connected with said conduit and also with said operating medium supply means for controlling the supply of operating medium to said combustion motor in dependence on the speed of said gas motor and simultaneously also in dependence on the pressure of the gas operating said gas motor, and with other speed responsive means connected to and operated by said gas motor, and gas flow control means connected with said conduit and said other speed responsive means for controlling the gas flow through said conduit in dependence on the speed of said gas motor.

18. An apparatus for controlling the output of plants comprising a floating piston compressor-motor producing an operating gas, and a gas consumer for consuming said operating gas, said apparatus comprising load responsive control means connected with said consumer and with said motor and being adapted to control the amount of operating medium supplied to said motor-compressor in dependence on the load on said gas consumer and to simultaneously control the admission of operating gas supplied to said consumer in direct dependence also on the load on said gas consumer, whereby coincidence of volume and pressure of the gas exhausted from said compressor-motor and of the gas operating said consumer is assured at all load conditions of the plant.

HANS STEINER.